(12) United States Patent
Lopez Gomez et al.

(10) Patent No.: US 8,580,880 B2
(45) Date of Patent: Nov. 12, 2013

(54) METHOD FOR STABILISING LIQUID MERCURY USING SULFUR POLYMER CEMENT, VIA MERCURY SULFIDE

(76) Inventors: Felix Antonio Lopez Gomez, Madrid (ES); Aurora Lopez Delgado, Madrid (ES); Francisco Jose Alguacil Priego, Madrid (ES); Manuel Alonso Gamez, Madrid (ES)

(*) Notice: Subject to any disclaimer, the term of this patent is extended or adjusted under 35 U.S.C. 154(b) by 0 days.

(21) Appl. No.: 13/395,268

(22) PCT Filed: Aug. 11, 2010

(86) PCT No.: PCT/ES2010/007054
§ 371 (c)(1),
(2), (4) Date: Mar. 28, 2012

(87) PCT Pub. No.: WO2011/029970
PCT Pub. Date: Mar. 17, 2011

(65) Prior Publication Data
US 2012/0322918 A1    Dec. 20, 2012

(30) Foreign Application Priority Data
Sep. 9, 2009  (ES) .................................. 200930672

(51) Int. Cl.
*C04B 24/28*    (2006.01)
*C01G 13/00*    (2006.01)

(52) U.S. Cl.
USPC ............ 524/439; 524/609; 588/313; 588/404

(58) Field of Classification Search
USPC .......................... 524/439, 609; 588/313, 404
See application file for complete search history.

(56) References Cited

U.S. PATENT DOCUMENTS

| 3,061,412 | A | * | 10/1962 | Giordano ...................... 423/565 |
| 4,354,942 | A | * | 10/1982 | Kaczur et al. ................. 588/256 |
| 4,844,815 | A |   | 7/1989  | Ader et al. |
| 5,034,054 | A | * | 7/1991  | Woodward ...................... 75/388 |
| 6,399,849 | B1|   | 6/2002  | Kalb et al. |
| 6,403,044 | B1| * | 6/2002  | Litz et al. ...................... 588/313 |
| 2008/0019900 | A1 | * | 1/2008 | Riviere-Huc et al. ...... 423/566.1 |
| 2009/0202407 | A1 | * | 8/2009 | Hurley ........................... 423/210 |

* cited by examiner

*Primary Examiner* — John Uselding
(74) *Attorney, Agent, or Firm* — Albert Bordas, P.A.

(57) ABSTRACT

The invention relates to a method for stabilizing liquid mercury using sulfur polymer cement, via mercury sulfide. The method for stabilizing liquid mercury by the production of sulfur polymer cement comprises (a) transformation of the liquid mercury into mercury sulfide (metacinnabar) by a chemical reaction, under stoichiometric conditions, between mercury and elemental sulfur; and (b) production of sulfur polymer cement by incorporating the mercury sulfide produced in the previous step into a stable mixture consisting of aggregates, elemental sulfur and sulfur polymer.

19 Claims, 4 Drawing Sheets

METHOD FOR STABILISING LIQUID MERCURY USING SULFUR POLYMER CEMENT, VIA MERCURY SULFIDE

The present invention refers to a method to stabilize liquid mercury using sulfur polymer cement, and previously transforming liquid mercury into mercury sulfide (metacinnabar).

STATE OF THE ART

Amalgamation is defined as the combination of mercury with a reactive metal such as copper, gold, zinc, aluminium, nickel, tin, silver, or sulfur resulting in a solid, non-volatile product. In fact, amalgams are semisolid solutions obtained by dissolving mercury and a solid metal. This process has been used for the extraction of precious metals from their ores (after amalgamation, the amalgam is subjected to a thermal treatment to volatilize the mercury and recover the precious metal). Although amalgamation is a relatively cheap and fast process for the treatment of liquid mercury, the disadvantages of the process arise from the difficulties to be used on a larger scale and the need of using diluted nitric acid to achieve high efficiency. Furthermore, the presence of water in the amalgam may lead to the formation of hydroxides of the amalgamating metal which makes the process unsuitable for the treatment of the contaminated mercury, for example with radioactive elements. Typically, the method is unable to adequately stabilize unstable forms of mercury in the hazardous waste materials.

In the case of the reaction with sulfur, several authors consider it as an amalgamation process, however, from the combination of mercury and sulfur a metal sulfide is formed, which is a novel compound and an amalgam or alloy. Thus, the processes that include the reaction with sulfur are considered as stabilization processes. Normally, the "Best Demonstrated Available Technology" (Best Demonstrated Available Technology—BDAT) for mixtures of residual elemental mercury waste is amalgamation, which is the formation of an alloy with other metals such as zinc, copper or gold. However, although BDAT considers it so, it is not really a process of amalgamation, because the reaction with sulfur forms a mercury sulfide.

In some processes mercury reacts with powdered and/or liquid sulfur (polysulfide) to form mercury sulfide. Mercury sulfide, the most stable compound formed between mercury and sulfur, exists in two stable forms. The first one is the black cubic tetrahedral form (metacinnabar) and the other stable form is the red hexagonal form, found in nature as cinnabar. Both forms are insoluble in water and in acidic solutions. In alkaline solutions with excess of sulfur anions HgS is solubilized by the reaction: $HgS+S^{2-} \rightarrow HgS_2^{2-}$.

Another usual method to form HgS consists in dissolving mercury in HCl, neutralizing it to form an $HgCl_2$ aqueous solution and then precipitating mercury sulfide by the addition of $Na_2S$. This method cannot be applied on a large scale because the mercury chloride is slightly soluble in water and produces a secondary effluent with a certain quantity of mercury.

Soluble mercury may be present in materials such as those deposited in landfills, sediments, etc., Often being physically and economically impossible to try to remove mercury from these materials. The effluents containing mercury from these deposits can contaminate water supplies and land. U.S. Pat. No. 4,354,942 describes a process for stabilizing in situ the soluble mercury in deposits of mercury-containing materials. The process comprises treating the deposits with an amount of stabilizer consisting of an inorganic sulfur compound (sulfides, alkali metal thiosulfates, alkaline earth metal thiosulfates, alkali metal dithionite and alkaline earth metal dithionite) Inorganic sulfur compounds react with soluble mercury to convert it into a mercury compound insoluble in water.

The direct reaction between elemental mercury and elemental sulfur to form HgS is widely known. The disadvantage of that method is that the reaction between the elemental S and the Hg is not total, i.e., it is possible that after the reaction a part of the elemental Hg remains as such, without becoming HgS. HgS is less leachable than elemental Hg and is a chemically stable product. To prevent some remains of mercury from being occluded in the sulfur, surfactants can be used to disperse the elemental mercury.

On the other hand, document U.S. Pat. No. 5,562,589 describes a stabilization method for the treatment of soil, sand, dredging of waterways and fly ash from incineration of waste (containing heavy metals and toxic or dangerous organic chemicals, such as polychlorinated biphenyls (PCBs) or polychlorinated dibenzo-p-dioxins (PCDD)), using sulfur at high temperature. Inorganic substrates are mixed with organic waste and sulfur, at a temperature above the melting point of the latter. The resulting mixture is maintained between 350-600° C. for an amount of time sufficient for the substrate stabilization to take place. The sulfur vapour generated in the previous reaction can be reused by being dragged by an inert carrier gas ($N_2$, $CO_2$ or a superheated steam flow). Thus, the inorganic substrates are converted into non-hazardous and non-leachable materials and any present organic chemical residual is simultaneously converted in a carbon and sulfur polymer, giving rise to an inert material.

Document U.S. Pat. No. 6,403,044 describes a process including the steps of: combining an initial residual containing mercury with a polysulfide and a reactive compound containing sulfur, other than polysulfide, to form a composite material; and mixing the composite material with the mercury or mercury residues in order to form mercury sulfide. Because many mercury residues contain water, the reactive compound containing sulfur reacts with mercury in an aqueous solution. Elemental sulfur, inorganic sulfur (alkali metal bisulfide, mercaptans, and sulfides of alkali metals) and/or mixtures thereof may be used as sulfur-bearing materials. Polysulfides act as activators of the reaction between the reactive compound containing sulfur and unstable forms of mercury, and are preferably selected from the group of calcium polysulfide, sodium polysulfide and other polysulfides of alkaline earth and mixtures thereof. This forms of polysulfides are highly soluble in water. The mixing step is performed by intrusive mixing techniques, using a device which allows mixing a viscous material and expelling or venting any vaporized liquid According to the authors, the final product can pass the Toxic Characterization Leach Procedure or TCLP test, and contain no more than 1000 ppm of elemental mercury and/or environmentally unstable forms of mercury species.

The reaction of elemental sulfur with mercury is spontaneous and highly exothermic at room temperature and its rate depends on temperature. The release of thermal energy of the reaction can raise the temperature of operation and, in turn, the reaction rate, thereby increasing the additional energy and can therefore lead to an uncontrolled reaction. The water and/or bulking agent are used to control the temperature during the mixing step and to prevent the temperature from exceeding 100-120° C. The bulking agent (any microporous granular material such as clay, cement, soil, etc.) provides not only temperature control but also sufficient volume for efficient mixing to take place.

Document U.S. Pat. No. 6,911,570 describes a method to stabilize heavy metals, including mercury, especially when these metals are dispersed within a particulate material (solid waste and soils). The process involves forming an insoluble metal sulfide through agitation of various additives with the particulate material by blowing oxygen into the particulate material in order to stimulate the sulfur-containing compounds to form the insoluble metal sulfide. The reactive metal may be an elemental form of Zn, Sn, Cu, Ti, Pb or mixtures thereof. The compounds containing sulfur may be sulfide or polysulfide, hydrogen sulfide, dimethylthiocarbamate, diethylthiocarbamate, sodium sulfide or sodium thiosulfate, calcium polysulfide. Often, the excess sulfur or polysulfide which has not reacted remains in the particulate material after it has formed the insoluble metal sulfide. Because the sulfur content is limited in many environmental regulations, the excess of sulfur produced in the above reaction is removed through its reaction with the reactive metals that the particulate material contains. To that end, iron is used, either metallic or any of its salts (chloride, sulfate . . . ) which react with the excess sulfur to form insoluble sulfides.

Document WO2006016076 describes a method for stabilizing metallic mercury through its reaction with sulfur in the solid state. The reaction takes place in a hermetically sealed reactor by adjusting the rotation, allowing working at a controlled pressure higher than atmospheric pressure.

There are studies on the formation of mercury sulfide on a laboratory scale by agitation of the elemental mercury and sulfur in various proportions, such as LN Oji (Mercury disposal via sulfur reactions. Journal of Environmental Engineering-ASCE 124 (10) (1998) 945 to 952. In this case, the reaction between the elemental S and the Hg occurs in a reactor that is closed and cooled by water to dissipate the heat generated in the reaction and in the presence of argon. The reactor has an agitation system consisting of a steel rod with blades. The agitation speed is 1060 rpm and the agitation time can vary between 30 and 60 seconds, using a molar ratio S/Hg between 0.20 and 0.28. In the study performed by M. Fuhrmann, D. Relamed, P D Kalb, J W Adams and L W Milina (Sulfur polymer solidification/stabilization of elemental mercury waste. Waste Management 22 (2002) 327-333), a mixture of liquid Hg and Hg residues (i.e., liquid Hg contaminated by radionuclides) is mixed with an excess of a sulfur polymer cement and sulfur additives (sodium sulfide and/or Cyanex 471 x). The mixture is heated to 40° C. for several hours until all the Hg has transformed into HgS. Subsequently, the mixture is heated to 135° C., a new quantity of sulfur and polymer cement is added, and a melted mass, which solidifies upon cooling, is obtained.

Recently, the formation of HgS from HgO and elemental Hg using natural and synthetic sulfides (pyrite and troilite) at different pH and under aerobic and anaerobic conditions, has been studied (M. Svensson, B. Allard, A. Düker. Formation of HgS— mixing HgO or elemental Hg with S, FeS or $FeS_2$ Science of the Total Environment 368 (2006) 418-423, M. Svensson, B. Allard, A. Düker. Formation of cinnabar-estimation of favourable conditions in a proposed Swedish repository. Journal of Hazardous Materials B136 (2006) 830-836). These types of processes are performed in "wet method", controlling the pH and in the presence or absence of air and using metal sulfides, such as pyrite, as S carrier materials

DESCRIPTION OF THE INVENTION

The authors of the present invention have found it possible to stabilize and immobilize liquid mercury by a process which comprises, first transforming Hg into metacinnabar (HgS) by reaction with elemental sulfur in a ball mill and later including it in a stable matrix manufactured using a mixture of aggregates, elemental sulfur and a sulfur polymer. In the present invention sulfur polymer cement is regarded as a mixture of aggregates, elemental sulfur and a sulfur polymer. This process of stabilization and immobilization is a new method of safely storing liquid mercury by obtaining materials with physicochemical properties that ensure its durability.

There are sulfur cements containing metallic Hg in varying amounts and with matrix formulations (a mixture of aggregates, sulfur and sulfur polymer) of various compositions. At the same time, the existing procedures do not use $CaCO_3$ ("filler") and the aggregates used are thicker, i.e., they have a granulometric distribution different from the one developed in this procedure.

In the present invention, the metallic Hg is introduced into the polymer matrix after turning it into mercury sulfide (HgS), which gives the final product the best physico-chemical properties (less leaching in aggressive conditions, better mechanical resistance to flexural and compression rupture and lower porosity, primarily). This makes the final materials object of this invention to be considered more stable in the short, medium and long term and, therefore, the process developed to have advantages for the safe and permanent storage of metallic Hg.

The present invention provides a method to transform metallic Hg in a less hazardous chemical product (less leachable in international standardized testing conditions) and to confine this product in a matrix made from a mixture of aggregates, elemental sulfur and a sulfur polymer.

Therefore, this invention relates to a method for stabilizing liquid mercury (hereinafter method of the invention) which comprises: Method for stabilization of liquid mercury comprising a step (a) in which liquid mercury and elemental sulfur are forced to react in stoichiometric conditions using a milling process, obtaining mercury sulfide (metacinnabar) as a reaction product.

In the present invention "method for stabilizing" means a physical-chemical method which also involves the chemical immobilization for the formation of a stable compound or a compound that is not soluble in water. Stabilization reduces or eliminates the possibility of vaporization or leaching into the environment of a dangerous substance such as Hg in normal conditions.

The milling process of step (a) is carried out by any milling process known to any person skilled in the art. Preferably, the milling process is performed in any ball mill. More preferably, the grinding process is performed in a high energy planetary mill, such as a Pulverisette 6.

In a preferred embodiment, the method described above further comprises a step (b) in which the product obtained in step (a) is added to a mixture comprising aggregates, elemental sulfur and a sulfur polymer, obtaining a sulfur polymer cement as the final product.

The liquid mercury suitable to be used in the method of the invention can come from any industrial process that generates it as a residue or subproduct. In a preferred embodiment of the method of the invention, the liquid mercury is a catalyst from the production of chlorine and a metal, which may be obtained from recycled batteries, temperature measuring equipment, or residues from gold mining, among others. Its treatment through the method of the invention eliminates its hazard and allows for its safe storage.

Therefore, in a preferred embodiment of the method of the invention, the starting liquid mercury comes from the caustic chlorine industry, thereby obtaining sulfur polymer cement by the method of the invention. As described in the present invention, starting with liquid mercury it is possible to obtain sulfur polymer cement whose properties will depend on the ratio of mercury sulfide present in the mixture, the ratio of sulfur and sulfur polymer and the ratio of aggregates.

The method of the invention is carried out with elemental sulfur. The following equation (equation 1) reflects the chemical reaction occurring in step (a):

Gibbs free energy ($\Delta G^0$) for the formation of metacinnabar ($\alpha$ HgS) (cf. Hepler, L G and Olofsson, G. Chemical Reviews, 75 (5), 582-602. 1975) according to the above equation is of −10.6 kcal.mol$^{-1}$ at 25° C.

In a preferred embodiment of the method of the invention, the elemental sulfur used in step (a), to act as a forming agent of the mercury sulfide in the aforementioned method, is any type of powdered elemental sulfur with a particle size <60 μm, although any elemental sulfur with a particle size larger than the previously stated may be used, it would be necessary to grind it in order to obtain a particle size less than the one stated above.

Preferably, commercial elemental sulfur arising from desulfurization of petroleum derivatives is used.

Preferably, said milling is performed in a ball mill at a speed of between 400 and 450 rpm for a period between 15 and 60 min. More preferably, the grinding speed is 400 rpm for a period of 60 min.

In another preferred embodiment of the method, the balls/reaction mixture weight ratio of step (a) (Hg and S) is between 5.3 and 10.7. And more preferably, the balls/reaction mixture weight ratio of step (a) (Hg and S) is 5.4.

Step (a) of the invention's method may be controlled through various experimental techniques known to a person skilled in the art. The choices of appropriate techniques, as well as their implementation, are routine tasks for a person skilled in the art. For example, the results obtained in the reaction of liquid mercury with sulfur may be studied through X-ray Diffraction (XRD), Scanning Electron Microscopy (SEM) and chemical analysis for determination of mercury through atomic fluorescence spectrometry.

Once the mercury sulfide has been obtained, the creation of stable sulfur polymer cement is carried out.

In a preferred embodiment of the method of the invention, in step (b), a mixture comprising aggregate, elemental sulfur and mercury sulfide obtained in step (a) is heated in an oven at a temperature between 155 and 165° C. Once the sulfur is melted, the temperature is lowered to about 130-150° C. The most preferred temperature is 140° C. Once that temperature has been reached, the sulfur polymer is incorporated into the hot mixture. Temperature is maintained at 140° C., stirring the mixture until completely melting the polymer, which is achieved in between 5 and 10 min. Preferably, the complete polymer melt takes place in about 6 min.

In the present invention, "sulfur polymer", is understood as chemically modified sulfur. The modification is necessary to prevent, while cooling the S, which has been heated to a temperature higher than 114° C., the formation of the S(alpha) species, orthorhombic, which appears at about 94° C., and the prevalence of the S(beta) mono clinical form, which is suitable for the transformation of S into polymeric forms and which may be used for obtaining sulfur cements.

There are many procedures to chemically modify sulfur. The modification may be accomplished through combination of sulfur with dicyclopentadiene (DCPD), cyclopentadiene (CPD), pentadiene, dipentene, organosilanes, glycol and oil, phosphoric acid and also through olefin hydrocarbon polymers, which has been the method of choice in this invention to modify the sulfur according to U.S. Pat. No. 4,058,500 by Vroom, A H (1981).

In the present invention, "aggregates", are understood as a granulated material which differs from other materials by their chemical stability and mechanical strength. They can be natural aggregates, such as sedimentary limestone (limestone or dolomite), sand, gravel, or other rocks like granite, basalt or quartzite, among others. They may also come from an artificial or recycled origin, such as construction and demolition waste.

In another preferred embodiment of the said method, the mixture of aggregates comprises gravel with a grain size less than 6.3 mm, in a ratio between 19% and 23% by weight based on the total weight of the mixture; sand in a ratio between 38% and 47% by weight based on the total weight of the mixture, calcium carbonate in a ratio between 6% and 8% by weight based on the total weight of the mixture; elemental sulfur in a ratio between 10% and 15% weight relative to the total weight of the mixture; sulfur polymer in a ratio of 1 to 1.5% by weight based on the total weight of the mixture; and mercury sulfur in a ratio between 6% and 30% by weight based on the total weight of the mixture.

Another preferred embodiment of the method further comprises a final stage in which the hot mixture obtained in step (b) is deposited in a mold to obtain a material with a suitable finish. Preferably, the material is placed on a vibrating table with a vibration frequency of 3000 rpm for a time ranging between 30 and 60 seconds, depending on the viscosity of the sample. The surface is smoothed and the stone material is allowed to cool to room temperature. It is then removed from the mold and stored at room temperature.

Overall, with both steps of the method of the invention— (a) transformation of liquid mercury into mercury sulfide (metacinnabar) by chemical reaction in stoichiometric conditions, between mercury and elemental sulphur; and (b) creation of a sulfur polymer cement by incorporating the mercury sulfide obtained in the previous step, into a stable mixture consisting of aggregates, elemental sulfur and a sulfur polymer, the complete stabilization of liquid mercury may be achieved.

Thus, sulfur polymer cements with a high mechanical resistance to compression and flexural rupture are obtained, which produce leachates that have an Hg content well below the limits permitted by current law and with high durability, all depending on the ratios used of the various materials involved in steps (a) and (b).

The present invention is applied to confinement in secure matrices of the metallic mercury coming from various industrial sectors (e.g. manufacturing processes of chlorine (caustic chlorine industries), mercury waste, and mercury-contaminated soils).

Throughout the description and claims the word "comprise" and its variations are not intended to exclude other technical features, additives, components or steps. To those skilled in the art, other objects, advantages and features of the invention will become apparent in part from the specification and in part from the embodiment of the invention. The following examples and drawings are provided by way of illustration and are not intended to be limiting of the present invention.

EXAMPLES

Below, the invention will be illustrated by means of tests made by the inventors which demonstrate the effectiveness of the process of stabilization of liquid mercury using sulfur polymer cement, via mercury sulfide.

A.—Materials Used.

Figure 1:
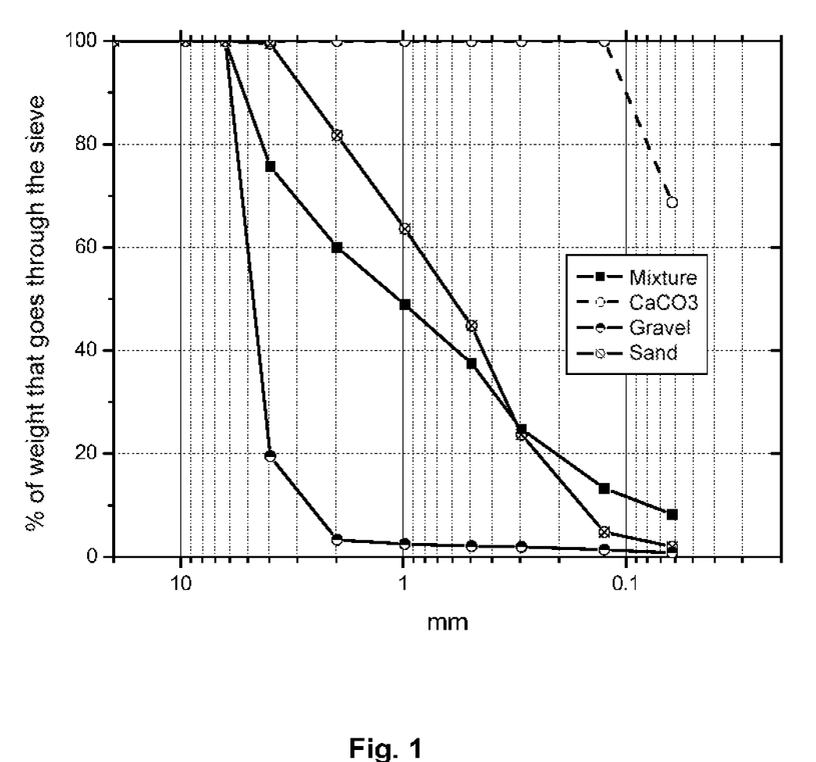
FIG. 1: Shows the granulometric curve of the aggregate mixture used in the embodiment of the invention.

Elemental sulfur was used with a particle size less than 60 µm from an oil refinery and a sulfur polymer (STX®). A dry mixture of gravel with a grain size between 4 and 6.30 mm and silica sand crushed to a grain size less than 4 mm were used as aggregates. Calcium carbonate (99.5% purity) with a particle size less than 0.125 mm was used as fine material. The ratio of each were expressed as % by weight, and they were 30-60-10 (gravel, sand and fine). The granulometric curve is shown in FIG. 1. The mercury used in these examples, is derived from a factory for obtaining chlorine through electrolysis of sodium chloride.

B. Formation of Mercury Sulfide.

Mixtures of liquid Hg and elemental S constituted by 86.2 g of mercury and 13.8 g of sulfur per 100 g of mixture were prepared. These ratios were adjusted to the stoichiometric reaction for the formation of HgS (equation 1). The formation reaction is carried out through the mechanical energy provided by a planetary mill Pulverisette 6, with a ratio of balls/load of 5.4 by weight, at a speed of 400 rpm and 1 hour of milling.

The mineralogical composition of mercury sulfide was determined by X-ray Diffraction (XRD) using a Bruker D8 Discover diffractometer with a Cu anode (Cu Kα radiation). The generator voltage and current were 40 kV and 40 mA respectively.

Figure 2:
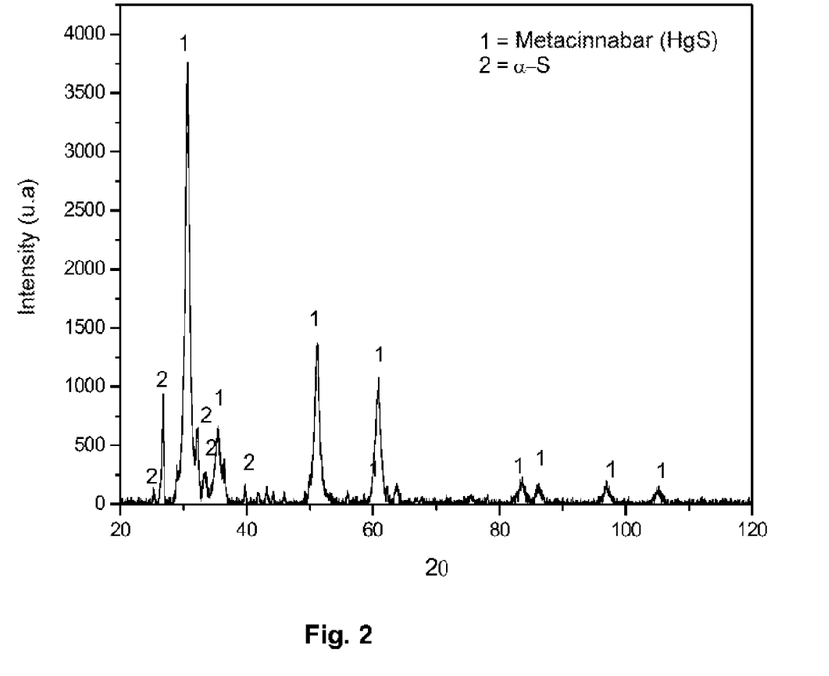
FIG. 2: Shows an X-ray spectrum of diffraction of the product of reaction between the liquid mercury and the elemental sulfur after 1 hour of milling.

As observed in the spectrum of X-ray diffraction (FIG. 2), the product of the reaction after 1 hour is constituted mainly by metacinnabar and much smaller amounts of residual sulfur.

The morphological analysis of the product obtained in the reaction between the liquid mercury and sulfur was performed by Scanning Electron Microscopy (SEM) using a Hitachi S-2100 microscope. The samples were prepared by depositing the reaction product on adhesive tape and then metalizing them with graphite.

Figure 3:
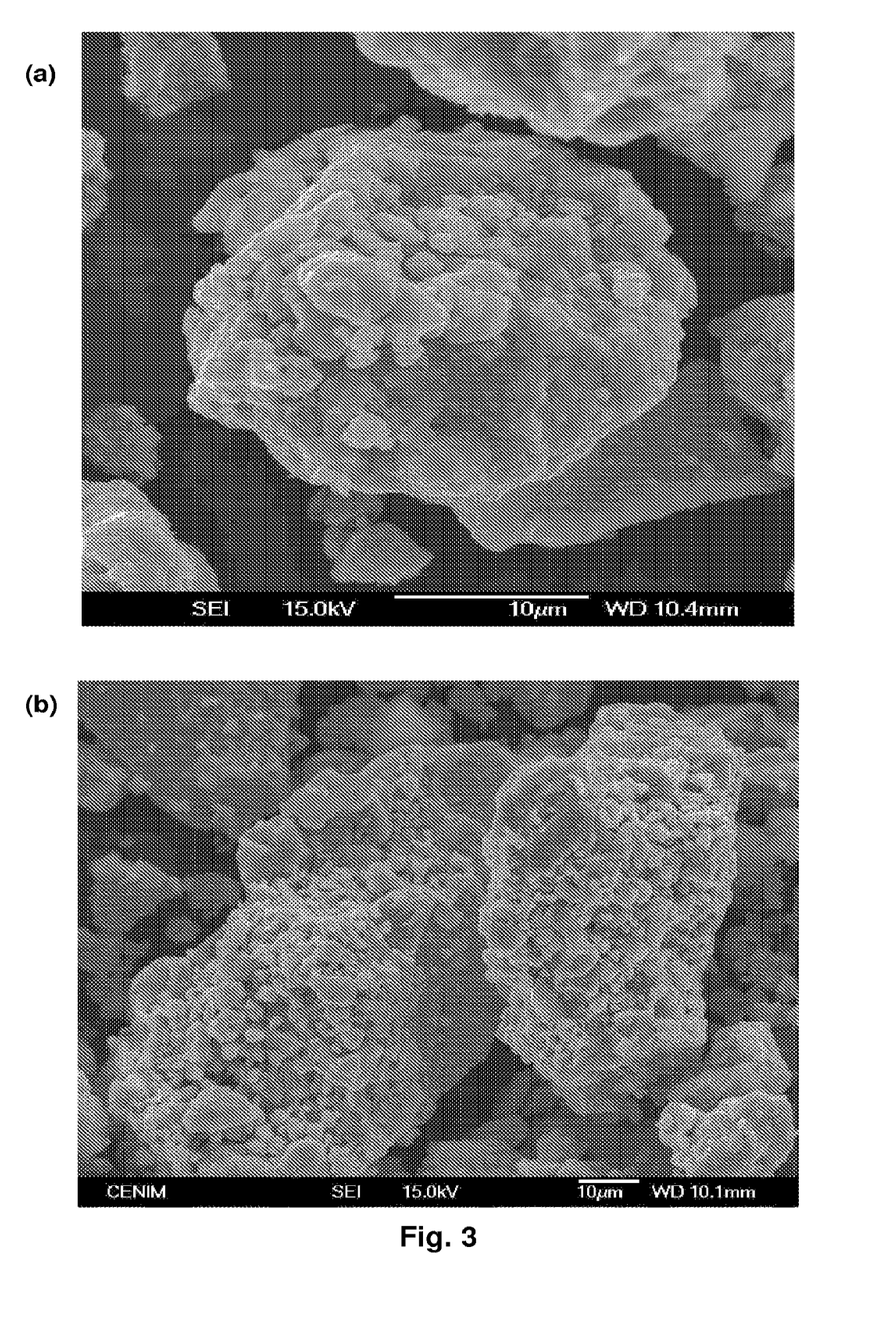
FIG. 3: Shows microphotographs of Scanning Electron Microscopy (SEM) of the reaction product obtained after 1 hour of milling [(a) appearance of a particle with a surface coating of metacinnabar, (b) appearance of a set of particles with irregular granular morphology, coated with metacinnabar crystals].

The morphology of the product of the reaction is shown in FIG. 3 (sections a and b). As it can be seen, it is preferably a granular morphology with a surface particle deposition of cubic habit metacinnabar.

For the determination of leachable mercury content, the TCLP (EPA Method 1311) protocol was followed. For this, three samples of 20 g each of the reaction products obtained after 1 hour of grinding were extracted with 400 ml of a mixture of acetic acid and sodium hydroxide. The samples were kept under agitation for 18 hours, after which they were filtered on a Millipore vacuum filter equipped with a prefilter with a flow size of 47 mm and a fiberglass filter with a flow size of 0.7 µm. The filtered solutions were acidified with nitric acid to pH<2 and the mercury content was determined through an analysis on a Leco AMA 254 equipment with the cold vapour atomic absorption technique.

The same analytical procedure was followed to determine the leachable mercury content in a sample of the initial liquid mercury used in the invention.

The analysis of the mercury content in the leached product obtained from the reaction between the mercury and sulfur, after 1 hour of milling, gives out an average value of 31 µg/l. The same analysis, carried out on samples of liquid mercury, gives out an average value of 8.96 mg/l. The permissible limit for Hg content in water is 200 µg/l.

C.—Creation of a Sulfur Polymer Cement by Incorporating the Mercury Sulfide to a Mixture Consisting of Stable Aggregates, Elemental Sulfur and a Sulfur Polymer.

Mercury sulfide (HgS) was used, which was obtained in the previous step to carry out the creation of stone materials by incorporating them into a mixture consisting of aggregates, elemental sulfur and a sulfur polymer.

The aggregate mixture described in section A and the elemental sulfur were kept between 155-160° C. in a glycerin bath before carrying out the reaction of formation of the stone materials. The mixture is stirred to facilitate the homogenization of the sulfur, which at this temperature is in a molten stage. When the mixture is at a temperature about 150° C., the mercury sulfide is added, which was obtained in the previous step, and then adding the polymer sulfur, shaking and stirring the mixture to facilitate its fusion and the homogenization of all components, which is achieved in about 6 minutes.

Not allowing the temperature to fall below 140° C., the hot mixture is poured into molds which are agitated in a vibrating table with a vibration frequency of 3000 rpm for a period ranging between 30 and 60 seconds, depending on the viscosity of the sample. The surface is then smoothed and the monoliths are allowed to cool to room temperature. They are then removed from the mold and stored at room temperature.

The molds used had 40×40×160 mm$^3$ dimensions which allow applying standard rules to the study of their physicochemical properties.

Varying amounts of mercury sulfide were mixed into the mixture of aggregates and sulfur. The mixtures were prepared by adding 15% of elemental sulfur to all of them (percent by weight based on total weight) and 1.5% of polymer sulfur.

Additions of HgS between 5.8% and 23.2% by weight based on the total weight of the mixtures were tested. These amounts are equivalent to liquid Hg content between 5% and 20% by weight based on the total weight of the mixtures. Table 1 shows the compositions of the mixtures tested.

Figure 4:
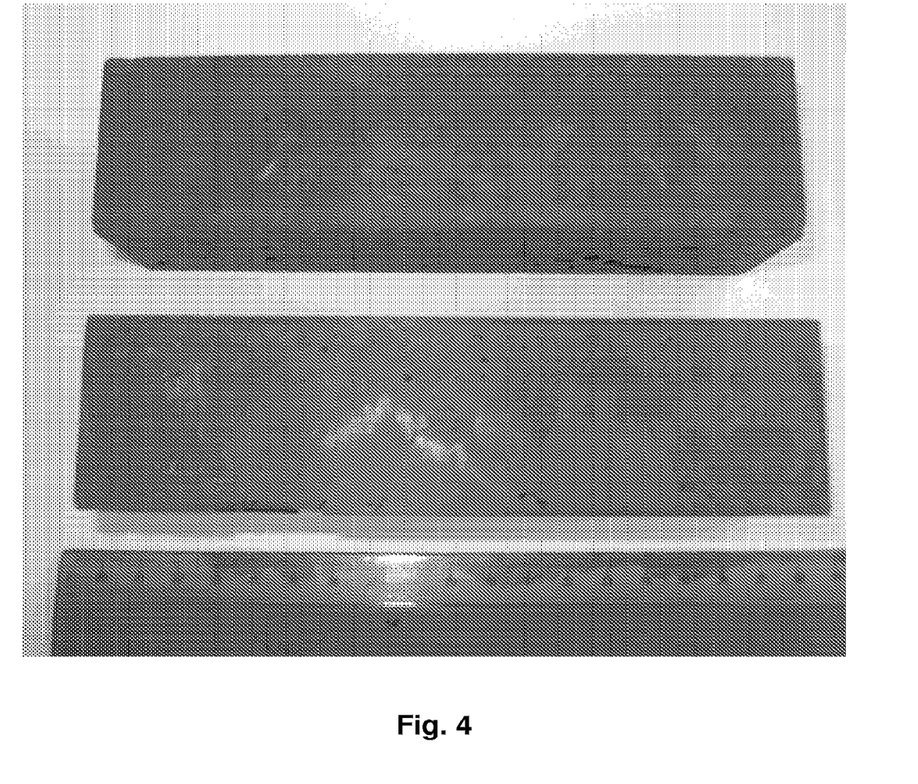
FIG. 4: Shows the macrophotograph of some of the sulfur polymer cements obtained after steps (a) and (b) of the process of the invention.

FIG. 4 shows macro photographs of the sulfur polymer cements obtained in the step previously described, containing various proportions of mercury sulfide.

TABLE 1

Composition of the mixtures tested with HgS (Data expressed in % by weight).

| Component | Mixtures | | | | |
| --- | --- | --- | --- | --- | --- |
| | HGS5 | HGS10 | HGS15 | HGS20 | HGS30 |
| Gravel < 6.3 | 23.3 | 21.6 | 19.8 | 18.1 | 14.61 |
| Sand | 46.6 | 43.1 | 39.7 | 36.2 | 29.22 |
| Fine | 7.8 | 7.2 | 6.6 | 6.0 | 4.87 |
| Free S | 15 | 15 | 15 | 15 | 15 |
| HgS | 5.8 | 11.6 | 17.4 | 23.2 | 30 |

TABLE 1-continued

Composition of the mixtures tested with
HgS (Data expressed in % by weight).

| Component | Mixtures | | | | |
|---|---|---|---|---|---|
| | HGS5 | HGS10 | HGS15 | HGS20 | HGS30 |
| Liquid Hg Equivalent | 5 | 10 | 15 | 20 | 30 |
| Polymer | 1.5 | 1.5 | 1.5 | 1.5 | 1.5 |

D.—Characterization of the Sulfur Polymer Cements Containing Mercury.

The study of the mechanical resistance to compression and bending tension (Table 2) of polymer cements described in Table 1 were then carried out, and were determined on a Universal Ibertest Autotest 200-10-W machine. The loading speed was 0.05 kN/s in bending tension and 2.4 kN/s in compression, according to the UNE 196-1 Standard. The table 2 contains the obtained data. The sample containing no HgS is a reference sample obtained under the same conditions as the other but without addition of mercury sulphide.

TABLE 2

Resistance to compression ($R_c$) and bending tension
($R_F$) in sulfur polymer cements containing HgS.

| HgS in the Cement (% weight) | Equivalent liquid Hg (% weight) | $R_{F\ (N \cdot mm^{-2})}$ | $R_{C\ (N \cdot mm^{-2})}$ |
|---|---|---|---|
| 0 | 0 | 9.6 ± 0.54 | 58.0 ± 2.7 |
| 5.8 | 5 | 9.3 ± 0.23 | 56.3 ± 2.3 |
| 11.6 | 10 | 8.7 ± 0.88 | 54.8 ± 2.8 |
| 17.4 | 15 | 9.6 ± 1.03 | 55.8 ± 5.6 |
| 23.2 | 20 | 9.1 ± 1.47 | 58.4 ± 4.2 |
| 30 | 30 | 8.5 ± 1.17 | 57.2 ± 4.4 |

Determination of leachable mercury content was performed following the TCLP (U.S. EPA Method 1311) protocol. To do that, three samples of 20 g each of the reaction product obtained after 1 hour of milling were extracted with 400 ml of a mixture of acetic acid and sodium hydroxide. Samples are maintained under agitation for 18 hours, after which they were filtered on a Millipore vacuum filter equipped with a prefilter with a flow size of 47 mm and a fiberglass filter with a flow size of 0.7 μm. The filtered solutions were acidified with nitric acid to pH<2 and the mercury content were determined through an analysis on a Leco AMA 254 equipment using the cold vapour atomic absorption technique. Table 3 shows the Hg contents in the leachates from produced sulfur polymer cements. All polymer cements containing mercury sulfide produce leachates with Hg contents lower than the value determined by the U.S. EPA as the limit value of Hg content in water (200 μg/l).

TABLE 3

Hg contents in the leachates.

| HgS in the Cement (% weight) | Equivalent liquid Hg (% weight) | Hg in leachates (μg l$^{-1}$) |
|---|---|---|
| 0 | 0 | 0 |
| 5.8 | 5 | 12.9 |
| 11.6 | 10 | 21.05 |
| 17.4 | 15 | 28.55 |
| 23.2 | 20 | 38.5 |
| 30 | 30 | 101.7 |

The skeletal density, $p_s$, and the real density, $p_r$, were determined using a helium pycnometer AccuPyc 1330. The skeletal density was determined in pieces of the sulfur polymer cements and the real density, grinding polymer cements until a particle size below 50 μm was obtained. The bulk density $p_b$, was determined by measuring the volume of polymer cement particle wrap (specific pore volume) using a GeoPyc 1360 equipment. From the densities' data, the values of total porosity ($P_T$), closed porosity ($P_c$) and open porosity to helium ($P_{He}$) were obtained. Table 4 shows the results of the measurements of the densities for some of the sulfur polymer cements obtained, comparing these values with those of a reference sample containing the same components except mercury sulfide. Shown in Table 5 are the porosities that were obtained.

The capillary water absorption was determined according to Standard UNE-EN 480. Different polymer cement samples were placed in a closed chamber with a 55% relative humidity and a water layer with a 5 cm thickness in which the cement test tubes were placed upright, i.e., resting on one of their sides. Each sample was individually weighed before insertion in the chamber. The test tubes were cured for 28 days and the amount of water absorbed alter immersion during 10 min, 30 min, 1 h, 3 h, 6 h, 24 h, 72 h and 28 days was determined.

After 28 days, the samples were removed from the chamber, dried with paper to remove excess surface water and weighed, determining the variation of mass (ΔM) and adsorption by capillary action ($W_S$) relative to the surface of each of the test tubes studied. This surface was, in all cases, 16 cm². Table 6 shows the results obtained in the measurements of absorption of water by capillarity, comparing the values obtained in the sulfur polymer cements that contain mercury sulfide, with a reference sample that contains the same components except the mercury sulfide.

The capillary water absorption is very low in all cases, and it is lower in sulfur polymer cements containing mercury sulfide than in the reference cement, as a result of mercury sulfide decreasing the open porosity of cements and the specific volume of pores (see Table 5). The capillary water absorption is much lower in sulfur polymer cements produced in a conventional cement mortar, for which the values of water absorption by capillary action is 2-3 g/cm².

TABLE 4

Real, skeletal and bulk densities of sulfur
polymer cements containing mercury sulfide.

| HgS in the Cement (% weight) | $p_r\ (g/cm^3)$ | $p_s\ (g/cm^3)$ | $p_b\ (g/cm^3)$ |
|---|---|---|---|
| 0 | 2.56 | 2.48 | 2.32 |
| 23.2 | 2.92 | 2.88 | 2.83 |
| 30 | 3.18 | 3.14 | 3.12 |

TABLE 5

Specific volume of pores and porosities of sulfur
polymer cements containing mercury sulfide.

| HgS in the Cement (% weight) | Specific pore volume (Vp) (Cm³/g) × 10⁻² | Total Porosity (Pt %) | Closed Porosity (Pc, %) | Open Porosity (Phe, %) |
|---|---|---|---|---|
| 0 | 3.25 | 7.67 | 2.93 | 4.74 |
| 23.2 | 1.01 | 2.88 | 1.44 | 1.44 |
| 30 | 0.63 | 1.97 | 1.40 | 0.57 |

TABLE 6

Results of water absorption by capillary

| HgS in the Cement (% weight) | ΔM (g) | $w_s$ (g · cm$^{-2}$) |
|---|---|---|
| 0 | 2.0 | 0.12 |
| 23.2 | 1.3 | 0.08 |
| 30 | 1.2 | 0.07 |

Water absorption at low pressure was determined following the methodology of test No. II.4 (Water absorption under low pressure (pipe method) of RILEM (International Union for Testing and Research Laboratories for Materials and Structures) consisting of determining the amount of water absorbed per unit area at a specific time under a pressure equal to 10 cm of water column. The test simulates actual situations where the pressure of the column represents the pressure produced by the collision of the droplets of rain water at high speed (approx. 140 km/h) against the material object of the study.

The results indicate that there is no water absorption at low pressure or in the case of sulfur polymer cements containing mercury sulfide, or in the referential sulfur polymer cement.

Comparing these results with other materials, e.g. a mortar of cement (52 ml/180 min), or a ceramic mortar (9.6 ml/180 min) or an impermeable mortar (1.96 ml/180 min) it is assumed that sulfur polymer cement materials are highly impermeable to water.

Water absorption and resistance to alkali for hydrophobic impregnation was determined following the UNE-EN 13580 Standard. To do this, the sulfur polymer cement samples containing mercury sulfide were placed in individual glasses with a 1550 ml capacity containing a sufficient amount of a potassium hydroxide solution with a concentration equal to 5.6 g/l to fill the cubic test tubes, placed in a spacer, with an excess of (25±5) mother glasses were capped with a transparent plastic film for (21±0.1) days. After this time, the cubic test tubes were removed from their respective vessels and air dried on a laboratory table until their weight was equal to ±2 g with respect to the initial weight of the test tubes. Then, each sample was again immersed in the alkaline solution and after 21 days were removed, air dried and weighed.

Next, a second immersion test was performed and the increase in weight of each cubic test tube treated after the alkali test was calculated. The absorption coefficient ($_{RA}$ alk), expressed in % in grams, may be determined by calculating the ratio between the weights of each sample after the study and the initial weight.

Table 7 shows the results obtained. Polymer sulfur elements containing mercury sulfide exhibit very high resistance to alkali.

TABLE 7

Resistance to alkali by hydrophobic impregnation.

| HgS in the Cement (% weight) | Aralk (%) |
|---|---|
| 0 | |
| 23.2 | 0.37 |
| 30 | 0.17 |

The resistance in salt spray chamber was performed according to the UNE-EN 14147:2003. For this purpose, an accelerated aging chamber by salt spray 450T Ascott was used. The salt solution was prepared by dissolving 100 g of NaCl (>95 w/w) per liter of deionized water, with an ionic conductivity lower than 20 μS/cm$^2$ The chamber's temperature was held constant at 35±5° C.

The test consisted of subjecting the sulfur polymer cements containing mercury sulfide and the referential polymer cement to 60 cycles of exposure in the saline atmosphere of the chamber. Each cycle consists of an exposure to salt spray for 4 hours and drying of the samples in the chamber for 8 h. At the end of the 60 cycles the test tubes were removed from the chamber and immersed in deionized water to remove all the deposited salt. The water was changed every day until complete removal of the salt, which is achieved when the conductivity of the solution in contact with the specimen does not exceed twice the characteristic value of the initial rinse water. Afterwards, the test tubes were dried at a temperature of 70±5° C. to constant mass. The results are expressed as loss of mass (% mass). Table 8 shows the weight losses of the samples of sulfur polymer cement containing mercury sulfide and those used for reference after the accelerated aging test in a saline spray chamber. Mass losses are less than 1% in all cases tested, which indicates that the sulfur polymer cements exhibit very high resistance to the saline atmosphere.

TABLE 8

Mass variations of the sulfur polymer cements after the study in the salt spray chamber.

| HgS in the Cement (% weight) | Loss in Mass (%) |
|---|---|
| 0 | 0.05 |
| 23.2 | 0.05 |
| 30 | 0.05 |

The invention claimed is:
1. A method for stabilizing liquid mercury, comprising the steps of:
   A) reacting in stoichiometric conditions liquid mercury and a first elemental sulfur through a milling process to obtain a first product;
   B) adding said first product to aggregates, a second elemental sulfur and a sulfur polymer to obtain a second product, said first and second elemental sulfur is a sulfur powder with a particle size less than 60 μm, and said adding is carried out at a temperature between 130° C. and 165° C.

2. The method for stabilizing liquid mercury set forth in claim 1, further characterized in that said milling process is performed at a speed between 400 and 450 rpm for a period between 15 and 60 min.

3. The method for stabilizing liquid mercury set forth in claim 2, further characterized in that said speed is 400 rpm for said period of 60 min.

4. The method for stabilizing liquid mercury set forth in claim 1, further characterized in that said milling process is performed in a ball mill.

5. The method for stabilizing liquid mercury set forth in claim 4, further characterized in that a balls/reaction mixture weight ratio is between 5.3 and 10.7.

6. The method for stabilizing liquid mercury set forth in claim 5, further characterized in that said balls/reaction mixture weight ratio is 5.4.

7. The method for stabilizing liquid mercury set forth in claim 1, further characterized in that said temperature is 140° C.

8. The method for stabilizing liquid mercury set forth in claim 1, further characterized in that said aggregates comprise gravel with a grain size of less than 6.3 mm, sand, and calcium carbonate.

9. The method for stabilizing liquid mercury set forth in claim 8, further characterized in that a first proportion of said gravel is between 19% and 23% by weight based on a total weight of said second product, a second proportion of said sand is between 38% and 47% by weight based on said total weight of said second product; and a third proportion of said calcium carbonate is between 6% and 8% by weight based on said total weight of said second product.

10. The method for stabilizing liquid mercury set forth in claim 1, further characterized in that a first proportion of said second elemental sulfur is 10-15% by weight based on a total weight of said second product, a second proportion of said sulfur polymer is of 1-1.5% by weight based on a total weight of said second product, a second proportion of said first product is between 6% and 30% by weight based on a total weight of said second product.

11. A method for stabilizing liquid mercury, comprising the steps of:
   A) reacting in stoichiometric conditions liquid mercury and a first elemental sulfur through a milling process to obtain a first product;
   B) adding said first product to aggregates, a second elemental sulfur and a sulfur polymer to obtain a second product, said first and second elemental sulfur is a sulfur powder with a particle size less than 60 μm, and said adding is carried out at a temperature between 130° C. and 165° C.; and
   C) depositing said second product in a mold.

12. The method for stabilizing liquid mercury set forth in claim 11, further characterized in that said milling process is performed at a speed between 400 and 450 rpm for a period between 15 and 60 min.

13. The method for stabilizing liquid mercury set forth in claim 11, further characterized in that said milling process is performed in a ball mill.

14. The method for stabilizing liquid mercury set forth in claim 13, further characterized in that a balls/reaction mixture weight ratio is between 5.3 and 10.7.

15. The method for stabilizing liquid mercury set forth in claim 14, further characterized in that said balls/reaction mixture weight ratio is 5.4.

16. The method for stabilizing liquid mercury set forth in claim 11, further characterized in that said temperature is 140° C.

17. The method for stabilizing liquid mercury set forth in claim 11, further characterized in that said aggregates comprise gravel with a grain size of less than 6.3 mm, sand, and calcium carbonate.

18. The method for stabilizing liquid mercury set forth in claim 17, further characterized in that a first proportion of said gravel is between 19% and 23% by weight based on a total weight of said second product, a second proportion of said sand is between 38% and 47% by weight based on said total weight of said second product; and a third proportion of said calcium carbonate is between 6% and 8% by weight based on said total weight of said second product.

19. The method for stabilizing liquid mercury set forth in claim 11, further characterized in that a first proportion of said second elemental sulfur is 10-15% by weight based on a total weight of said second product, a second proportion of said sulfur polymer is of 1-1.5% by weight based on a total weight of said second product, a second proportion of said first product is between 6% and 30% by weight based on a total weight of said second product.

\* \* \* \* \*